United States Patent [19]

Rutman

[11] Patent Number: 5,671,697
[45] Date of Patent: Sep. 30, 1997

[54] EXPANDABLE PET CAGE AND METHOD

[76] Inventor: Mark A. Rutman, 26240 Hendon, Beachwood, Ohio 44122

[21] Appl. No.: 505,775

[22] Filed: Jul. 21, 1995

[51] Int. Cl.⁶ .................................................. A01K 1/03
[52] U.S. Cl. ............................ 119/473; 119/472; 119/752
[58] Field of Search .............................. 119/452, 453, 119/472, 473, 482, 496, 498, 500, 491, 752, 606, 676; 190/22, 104, 105; 312/296; 220/8

[56] References Cited

U.S. PATENT DOCUMENTS

| 108,187 | 10/1870 | Rice | 190/22 |
|---|---|---|---|
| 1,303,736 | 5/1919 | Speicher . | |
| 1,345,968 | 7/1920 | Speicher . | |
| 1,449,428 | 3/1923 | McGaffee . | |
| 3,683,512 | 8/1972 | Beam, Jr. | 119/606 X |
| 4,140,080 | 2/1979 | Snader | 119/473 |
| 4,228,765 | 10/1980 | Berlin | 119/752 |
| 4,770,127 | 9/1988 | Volk | 119/473 |
| 4,991,543 | 2/1991 | Silberman | 119/473 |
| 5,010,848 | 4/1991 | Rankin | 119/461 |
| 5,016,772 | 5/1991 | Wilk | 220/8 |
| 5,054,426 | 10/1991 | Panarelli et al. | 119/473 |

FOREIGN PATENT DOCUMENTS

| 2569084 | 2/1986 | France . |
|---|---|---|
| 3439279 | 10/1984 | Germany . |
| 195734 | 4/1923 | United Kingdom . |

Primary Examiner—Robert P. Swiatek
Assistant Examiner—Yvonne R. Abbott
Attorney, Agent, or Firm—Renner, Otto, Boisselle & Sklar, P.L.L.

[57] ABSTRACT

An expandable pet cage for animals, and a method for house-training pets of various sizes comprises two complimentary compartments that are in telescopic relation to each other, thereby providing an adjustable composite volume to house a pet. The adjustable composite volume facilitates using the natural instincts of the pet to resist excreting in the volume of the confinement, thus resulting in house-training the pet. The adjustable volume also can be relied on to hold an animal securely and safely during transporting, and provides an efficient enclosure for drying a pet after grooming. Also, the adjustable composite volume provides the pet owner with the convenience of only having to purchase one cage even if dogs of various sizes are to utilize the cage at different times and for different purposes.

24 Claims, 2 Drawing Sheets

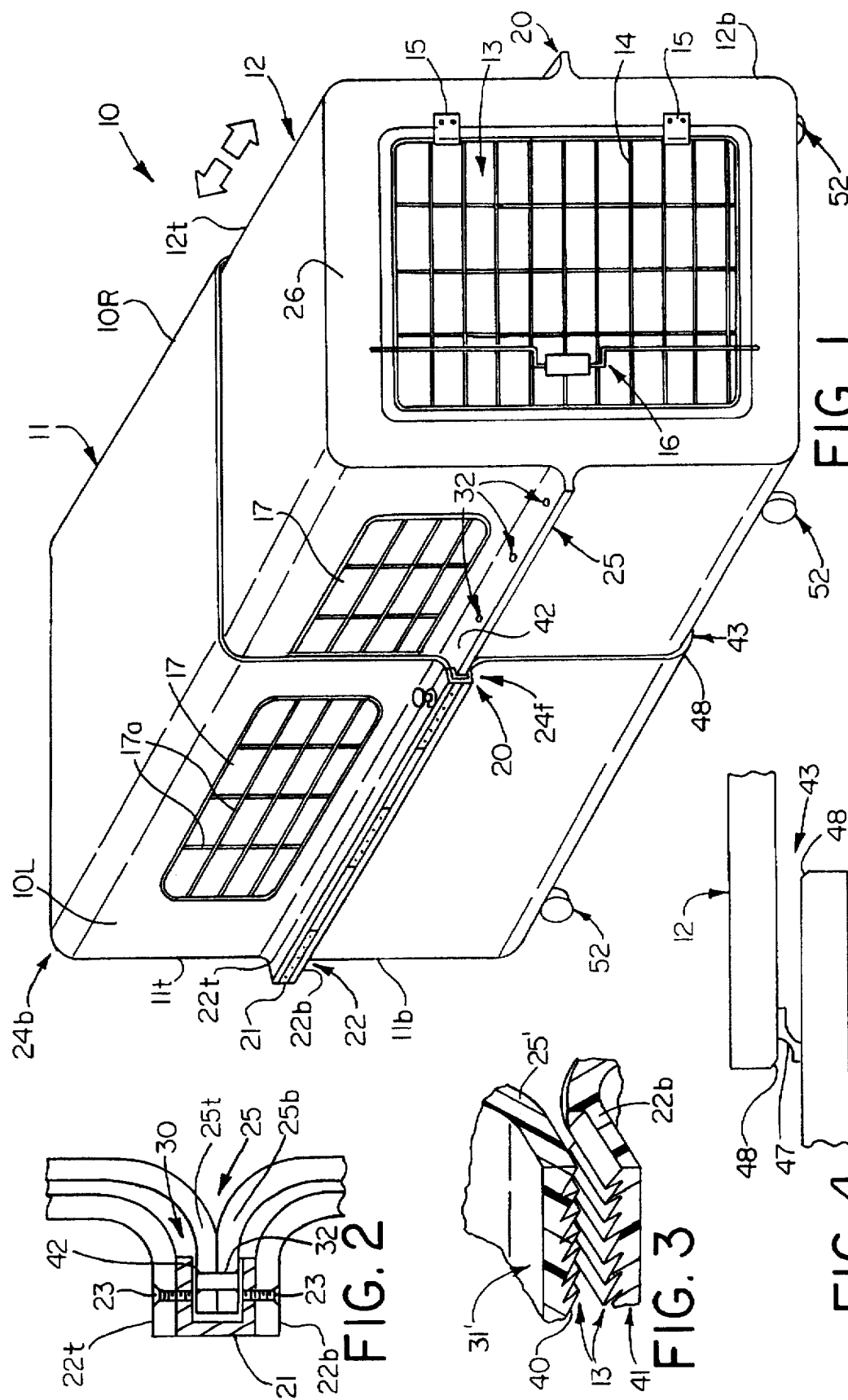

EXPANDABLE PET CAGE AND METHOD

TECHNICAL FIELD

The present invention relates generally, as indicated, to an expandable pet cage, a method for house training a puppy or other pet animal, a method that facilitates grooming an animal, and a method for safely transporting an animal in an aircraft, boat or automobile, and, more particularly, to animal cages that may be expanded or collapsed to accommodate pets of various sizes and years of development and methods of using such cages.

BACKGROUND

Various types of devices have been developed to facilitate convenient transporting and housing of pets. These devices include many types of cages, shell-type carriers and other similar forms of enclosure. Such devices tend to fall into either of two categories: (1) small, movable or portable cages or housings outfitted with handles and hinged access members, and (2) larger stand-alone cages. The first type of construction facilitates transporting pets. However, many domestic pets such as dogs may substantially increase in size during their development. Consequently, it is likely that at least one larger replacement cage eventually will be required to house the pet.

There are several disadvantages associated with initially acquiring only a cage that is of such a size to accommodate properly the pet at maturity and not first obtaining a relatively small size cage that is a better size to "fit" the pet when immature. Cages that are disproportionately large, as compared to the size of the animal, can result in injury to a small or relatively immature pet due to sliding around and jostling during transporting. Additionally, a large size cage is less amenable to storing in a home. Moreover, cages are often employed to house-train a puppy—cages that are large as compared to the size of the pet inhibit the instinctual self-training that a pet undergoes when confined to a relatively small area.

Cage training is the most widely accepted means of house training dogs in the world. This method is successful because certain pets such as puppies will not soil their sleeping quarters, and if the cage is small enough (just enough room for the puppy to turn around in it) the pet will remain dry until released from its cage by its owner. If the cage is too large, however, the puppy will use one end of the cage for "bathroom habits" and the other end for sleeping. This presents a dilemma for pet owners wishing to purchase a cage for their newly-acquired puppy. If the owner were to purchase a small puppy-sized cage, eventually a larger cage would have to be purchased to match the growth of the puppy into adulthood. This becomes expensive. If an adult-sized cage were purchased for use with a small puppy, the pet owner must reduce the cage size by cutting sheets of plywood or some other suitable material and placing them in the cage to serve as barriers to part of the cage, thus reducing the size of the space inside the cage. Reducing space available to a puppy inside a cage facilitates house-training. Sometimes, various other items such as pillows, cardboard or plastic boxes, may be inserted into the cage to reduce space. These various articles are difficult to conform to the shape of the cage, and the puppy may dislodge these articles and, then having access to the previously blocked off part of the cage, create a mess in the cage.

Also, expandable pet cages lack sufficient waterproofing to confine the excrement, e.g., to prevent leakage.

An example of an expandable cage is disclosed in U.S. Pat. No. 5,054,426. The cage of that patent can be adjusted by sliding the parts thereof to accommodate different sized animals. However, the sliding mechanism of that cage consists of guide bars fitted into guide tracks along the bottom edge corners of the cage, and dirt, corrosion or breakage there may impede sliding. The lack of water-tightness and the use of an open-air inner cage portion allows dirt, corrosion and/or breakage further to limit the ease of sliding of the compartments relative to each other. Some of the pet excrement in the cage inevitably will deposit on and along the guide tracks resulting in increased resistance and corrosion of the guide bars and guide tracks.

SUMMARY

According to one aspect of the invention, an expandable pet cage includes first and second compartments; each of the compartments having an open end and a closed or closeable end; the compartments being positioned in telescoping relation providing a composite volume including both of the open ends; and a substantially liquid-tight seal between the compartments at the bottom thereof.

Another aspect relates to an expandable pet cage, including first and second compartments; each of the compartments having an open end and a closed or closeable end; the compartments being positioned in telescoping relation providing a composite volume including both of the open ends; a slide interconnect between the compartments, and along which one of the compartments can slide relative to the other of the compartments to modify the size of the composite volume, the slide interconnect being located between the top and bottom of the compartment, and including portions integral with the sides of the compartments; and a substantially liquid-tight seal between the compartments at the bottom thereof, the substantially liquid-tight seal being maintained during sliding of one of the compartments.

Another aspect relates to a method of house-training a pet, including the steps of placing the pet in an size-adjustable cage; and adjusting the size of the cage to confine the pet to a volume that does not permit bodily excretion at a separate area, thereby using the natural instinct of the pet to resist excreting in the volume of the confinement.

Another aspect relates to a method of confining a pet for travel safety in an aircraft, boat or automobile, including the steps of placing a pet in a size-adjustable cage; and adjusting the size of the cage to limit undesirable movement of the pet therein, whereby the cage provides support to avoid accidental injury and jostling of the pet in the cage during transporting of the cage and pet.

Another aspect relates to a method of grooming a pet, including the steps of placing a pet in a size-adjustable cage; and adjusting the size of the cage to accommodate the pet for a drying part of the grooming procedure, wherein the adjusting further includes substantially minimizing the size of the cage to optimize drying efficiency.

A further aspect of the invention relates to an expandable pet cage which has a sliding mechanism located above the bottom of the cage to avoid the accumulation of waste products on the sliding mechanism.

Another aspect is to avoid excrement of a pet from impeding the sliding mechanism of an adjustable size pet cage.

Another aspect of the invention relates to an animal enclosure that is easy to store, occupies a minimum amount of space, is easy to transport (including in vehicles), and confines waste products of a pet to avoid leakage.

Another aspect of the present invention relates to facilitating house-training a pet.

Another aspect of the invention allows owners of multiple pets to purchase only one cage which accommodates to the appropriate size and shape for each individual pet without having to purchase multiple cage units.

An additional aspect relates to facilitating the grooming of a pet.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be suitably employed.

Although the invention is shown and described with respect to one or more preferred embodiments, it is obvious that equivalents and modifications will occur to others skilled in the art upon the reading and understanding of the specification. The present invention includes all such equivalents and modifications, and is limited only by the scope of the claims.

BRIEF DESCRIPTION OF THE DRAWINGS

In the annexed drawings:

FIG. 1 is an isometric illustration of a pet cage in accordance with the invention;

FIG. 2 is an enlarged, fragmentary section view of the slide interconnect assembly of the cage of FIG. 1;

FIG. 3 is an enlarged, fragmentary section view of an alternate slide interconnect assembly that employs teeth;

FIG. 4 is a fragmentary section view of a seal at the bottom of the cage, such illustration being exemplary, and the seal being similar along parts of the sides of the cage;

DESCRIPTION OF THE INVENTION

Figure 5:
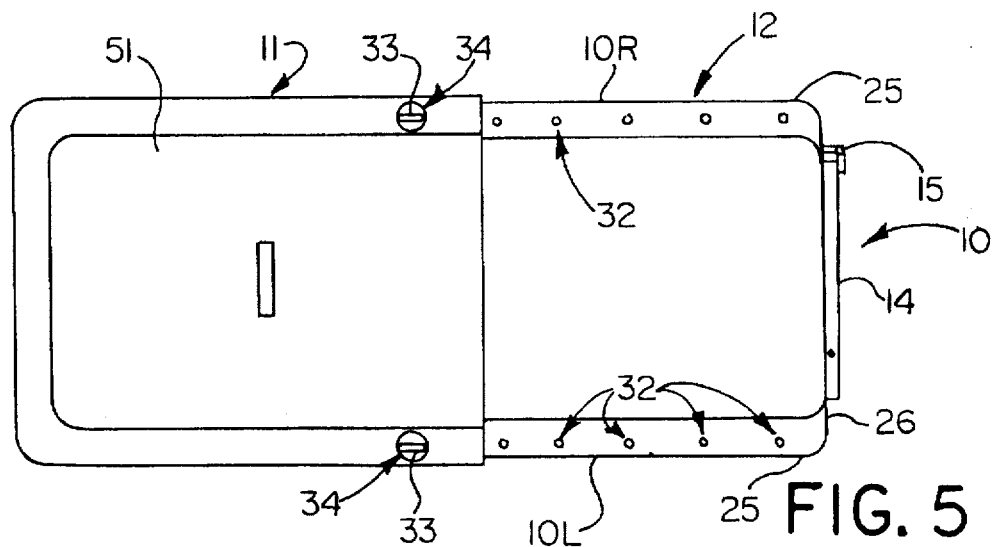
FIG. 5 is a top view of the cage.

Referring to the drawings, wherein like reference numerals designate like parts in the several figures, and initially to FIG. 1, a size-adjustable pet cage in accordance with the present invention is generally indicated at 10. The cage 10 is described herein with respect to use with a pet dog animal. However, it will be appreciated that the features of the invention may be used with other animals to provide a cage therefor along with the various functions described herein.

The cage 10 includes a pair of compartments or housing portions 11, 12 which can be mounted in the manner illustrated in FIG. 1 in telescoping relation to each other to provide an interior composite volume 13 that can be adjusted in size depending on the telescoped position relationship of the two housing portions 11, 12. A door 14 can be opened to provide access to the interior volume 13 to place a dog therein, and the door can be swung closed on hinges 15 and secured closed by a conventional latch or lock mechanism 16 to prevent the dog from exiting the cage 10. Windows 17 in one or more of the walls of the cage 10 provide ventilation to the interior volume, and the door 14 may be of spaced wire or mesh design to provide ventilation, too. The door 14 and windows 17 also permit light to enter the interior volume 13 and also permit viewing of the pet inside the cage.

A slide interconnect assembly 20 guides the two compartment or housing parts 11, 12 as they are moved in telescoping relation to each other to enlarge or to reduce the size of the interior composite volume or compartment 13 of the cage 10.

In using the cage 10, the compartment portions 11, 12 are adjusted in telescoping relation to a desired size of the interior volume 13 for a particular dog. The door 14 is opened and the dog is placed inside the cage. The door 14 is closed and the latch 16 is secured. The dog can be released from the cage 10 by unlocking the latch 16 and opening the door 14. In adjusting the size of the volume 13, a user would take into consideration the size of the dog and the uses of the cage 10. For example, if the dog were mature, of relatively large size, and house-trained, and the cage were not intended to be transported, the cage could be adjusted to relatively large size to accommodate the dog and to permit space for the dog to move about in the cage. However, if the cage and dog were to be transported, then the size may be adjusted to one suitable to accommodate the dog but to minimize movement; therefore, during transporting, there would not be space for the dog to slide or to be jostled in the cage and the possibility of injury can be reduced. If the dog were immature and not house-trained, such as a relatively young puppy, the cage may be adjusted to relatively small size. The small size limits the space available for the puppy to move in the cage and minimizes the likelihood that the puppy would excrete waste in the cage, for instinct causes the puppy to avoid excreting waste in space usually occupied by the puppy.

With the above in mind, then, the invention relates to a method of confining a pet for travel safety including the steps of placing a pet in the size-adjustable cage 10 and adjusting the size of the cage to limit undesirable movement of the pet therein so that the cage provides support to avoid accidental injury caused by jostling, movement, sliding, etc. of the pet in the cage during travel motion as the cage is transported from one location to another. The transporting can be by hand, in a vehicle, such as an aircraft, boat or automobile, or the cage and animal may be moved in any way from one place to another. The order in which the steps are carried out, for example, whether the pet first is placed in the cage and then the cage is adjusted in size or the size adjustment first is made and the pet then is placed inside, ordinarily would not be critical. The cage 10 will conform to airline standards in terms of size and durability. The cage provides added safety for pets who travel in the baggage compartment of commercial aircraft because jostling of the pet is nearly eliminated.

For house training a pet, the cage 10 of the invention may be used by adjusting the size of the cage to confine the pet to a volume that does not permit bodily excretion at a separate area other than that actually or primarily occupied by the pet. The pet is placed in the size-adjustable cage. The natural instinct of the pet resists excreting in the volume of confinement in the cage. Therefore, the various walls of the cage themselves provide the desired containment for the pet, and it is unnecessary to use other means, such as pillows, cardboard, wood, etc., in the cage to block the pet from gaining access to other space in the cage. Preferably sufficient sealing of the cage is provided to prevent leakage of excrement from the cage, as is described further below, and this seal function or waterproofing tends to prevent leakage of waste, contains the waste in the cage, and provides another incentive for the pet to avoid excreting waste in the cage itself. If desired, as the pet becomes house-trained, a reward can be provided by enlarging the cage providing additional free space for the pet therein.

The size-adjustable cage 10 of the invention also may be used in carrying out a method of grooming a pet. During the grooming process the fur of the pet usually is wetted, e.g., shampooed, and eventually has to be dried. An appliance is used to blow air on the pet to speed the drying process. However, frequently the pet tries to move away from the air blowing appliance, which increases the difficulty of grooming the pet and also delays the drying process. An aspect of the invention relates to a method of grooming a pet wherein the pet is placed in a size-adjustable cage and the size of the cage is adjusted to accommodate the pet to limit movement in the cage. An airflow may be directed into the cage to dry the pet. The airflow may enter from one or more windows 17, from the door 14, and/or from other access openings (not shown). The cage preferably is adjusted to a size to prevent the animal from turning in the cage, and, therefore, airflow can be directed to the animal from respective locations to achieve the desired drying effect in an efficient manner. Various connections also may be provided to the cage to facilitate directing airflow to the animal in the cage.

In the grooming method of the invention, the order of carrying out the steps of placing the pet in the cage and adjusting the size of the cage can be varied, as may be desired. An advantage to adjusting the size of the cage before placing the animal in the cage is that the desired positioning of the animal in the cage, e.g., the direction the animal is facing, usually can be carried out more easily than if the animal first were placed in the cage and the size later adjusted. Furthermore, by minimizing the size of the cage to accommodate the animal in reasonable comfort but to avoid the animal moving about in the cage, the animal will tend not to excrete waste in the cage during the drying process, as was described above.

The two compartment housing portions 11, 12 may be fabricated from a highly durable, low weight, waterproof material, such as a plastic, a copolymer, etc. The housing portions 11, 12 may be fabricated by plastic molding technique, such as injection molding, blow molding, etc.; or they may be made by some other technique. Also, if desired the housing portions 11, 12 may be made of a material other than plastic or copolymer. Such material may be metal, wood, etc. Each compartment housing portions 11, 12 may be a separate integrally formed structure. For example, the compartment housing portion 11 may be molded as a single piece, and the compartment housing portion 12 may be molded as a single piece. The windows 17 may be integrally molded as part of the respective housing portion 11, 12, for example, being a grid work of plastic ribs 17a. Alternatively, the windows may be openings in one or more walls of the respective housing portion, and, if desired, one or more of those openings may be covered by a grid work, screen mesh, or the like to provide light and ventilation to the interior volume 13 of the cage 10 while preventing an animal from escaping or extending part of its body out of the window.

One or both of the component housing portions 11, 12 may be formed as multiple parts. Such multiple part construction is shown in the detail of FIG. 2 and also is seen in FIGS. 1 and 5–7. Specifically, as is seen in FIG. 2 together with FIG. 1, the component housing portion 11 has top and bottom housing parts 11t and 11b; and the component housing portion 12 is formed of respective top and bottom housing parts 12t, 12b. The top and bottom housing parts 11t, 11b of the component housing portion 11 may be secured together to form a structure like that shown in FIG. 1, for example. The method of fastening those parts together includes the use of an angle bracket slide member 21, which is fastened to flanges 22t, 22b (composite flange 22) of the top and bottom housing parts 11t, 11b by screw fasteners or some other fastener means 23. The angle member 21 may extend along the entire length of the flanges 22t, 22b on both sides left and right 10L, 10R (FIGS. 4 and 6) of the component housing portion 11. Additionally, the flanges 22t, 22b may extend around the back 24b of the component housing portion 11 and be secured together by an angle member 21 in the manner just described. If desired, the angle member 21 may extend less than the entire distance of a pair of confronting flanges, such as those designated 22t, 22b in which case a small gap may be provided between otherwise adjacent angle members providing additional space for ventilation, light, etc. to enter the interior composite volume 13 of the cage 10. As a further alternative, the top and bottom housing parts 11t, 11b may be fastened at respective flanges 22t, 22b by means other than the angle member 21 or the two housing parts may be molded as a single integral unit, and in either case an angle member 21 may be located only at the forward end 24f thereof inserted to provide a reinforcement and slide surface against which the flange 25 of the composite housing 12 may rub or slide in a fairly accurately controlled positioning manner while also avoiding damage to confronting plastic surfaces of flanges.

As was mentioned above, the component housing portion 12 may be made of a single integral part or it may be formed of plural parts, such as those designated 12t, 12b, which are joined at a connection of flanges 25t, 25b (composite flange 25) seen more clearly in FIG. 2. The flanges 25t, 25b may be secured by adhesive, rivets, screw fasteners, or by some other means along the two side walls of the cage 10, as is seen in FIG. 1. If desired, a portion of the flange 25 also may be extended across the front wall 26 of the housing portion 12, being arranged so as not to interfere with the ability of the door 14 to be opened and closed.

The slide interconnect assembly 20 includes the interfitting flanges 22, 25; the respective flanges 25 can fit within and slide within the space 30 provided by the flange 22 and, if used, angle member 21. Preferably the vertical height of the flange 25, as it is seen in FIG. 2, for example, and the vertical height of the space 30 are nearly identical to provide a relatively close fit allowing a smooth sliding between the respective component housing portions 11, 12 to effect telescoping thereof to enlarge or to reduce the interior composite volume 13 of the cage 10.

A size locking mechanism 31 can be used to fix the housing portions 11, 12 in desired telescoped position with respect to each other to provide a particular size volume 13 of the cage 10. The size locking mechanism 31 can be used to prevent further telescoping in one direction or the other of the housing parts 11, 12. An exemplary size locking mechanism 13 includes a plurality of openings 32 located at spaced apart positions in the flange 25 and a locking pin 33, which may be inserted through an opening 34 in the flange 22 to extend into one of the openings 32. When the pin 33 is in place in opening 34 and one of the openings 32, the pin prevents further sliding action along the slide interconnect assembly 20 and telescoping of the cage 10. There may be a slide locking mechanism 31 only on one of the flanges on one side of the cage 10. There may be a size locking mechanism 31 at the slide interconnect assembly on both sides of the cage 10. Also, although only a single pin 33 and opening 34 in the flange 22 is shown in FIG. 1 near the leading or front end of the flange 22, additional openings 34 may be provided in the flange 22 at respective locations along the length thereof to insert pins 33 for engaging respective openings 32. Thus, the size locking mechanism 31 may include a single pin 33 in a single flange 22, a separate pin 33 in each of the flanges 22 on opposite sides of the cage 10, or a plurality of pins 33 associated with one or with each of the respective flanges 22 and openings 32. To change cage size, the pin(s) 33 can be removed and the housing portions telescoped in one direction or the other.

Briefly referring to FIG. 3, primed reference numerals designate parts corresponding to those described above and designated by the same unprimed reference numerals, an alternate size locking mechanism 31' is shown in partial view. The size locking mechanism 31' includes a plurality of saw teeth like grooves 40 in the flange 25' and corresponding saw teeth like grooves 41 in the bottom flange 22b'. The teeth 40, 41 can mesh together and prevent the withdrawing out of the component housing portion 12 in opening telescoping fashion. However, by lifting the housing portion 12 up relative to the housing portion 11 a slight amount so as to disengage the teeth 40, 41, the housing portion 12 can be withdrawn from the housing portion 11. The teeth 40 may be located along substantially the entire length or a fairly extended length of the flange 25' of the housing portion 12. However, the teeth 41 may be located only near the forward end relative to the illustration of FIG. 1 of the housing portion 12 to provide a suitable locking function, while facilitating intentional disengaging of the teeth 40, 41 allowing for the housing portion 12 to be pulled out from the housing portion 11.

It will be appreciated that other types of size locking mechanisms may be used to secure the housing portions 11, 12 relative to each other so that after the size of the cage 10 has been adjusted, the size will be maintained until intentionally readjusted.

As is seen in FIG. 4, for example, the seal 43 is located between the bottom walls of the telescoping housing portions 11, 12 of the cage 10. The seal 43 includes a seal member 47, which cooperates with walls of the housing portions to tend to prevent liquid, excrement, dirt, or the like from exiting the cage 10. An exemplary seal member 47 is an elastomeric material; another exemplary seal member is a plastic or a Teflon-like material which can provide a sealing function while permitting the telescoping action of the two housing portions 11, 12. Other seal members or seal materials also may be used.

The seal member 47 is attached to the outside of the wall of the housing portion 12. Such attachment may be by adhesive material or by a fastener, such as a screw, rivet, etc. The seal member 47 is recessed from the leading edge 48 so it would not be damaged by the animal in the cage 10. The seal member 47 includes a wiper portion 48, which wipes against the inside of the wall of the housing portion 11. Preferably the attachment to the wall of the housing portion or compartment 12 and the wiping engagement against the wall of the housing portion or compartment 11 are sufficient to block fluid flow, such as urine or water, excrement, dirt, etc. from exiting or leaking from the cage at the area of the seal 43. If desired, the seal 47 may be attached to the wall of the housing portion 11 and wipe against the wall of the housing portion 12.

The weight of the housing portion 12 against the seal member 47, which has a suitable elasticity, causes a compression of the seal member between the housing portions 11, 12. The seal 43 is U-shape; it commences just below the slide interconnect assembly 20 on one side of the cage, traverses across the bottom of the cage, and ends just below the slide interconnect assembly 20 on the other side of the cage. Thus, the entire lower half of the cage including the sides below the sliding mechanism and the entire floor of the cage would be sealed, and fluids would thus be prevented from leaking out of the telescoping housing portion 11, 12 of the cage.

Preferably the slide interconnect assembly 20 for the cage 10 is located up above the bottom or floor area of the cage 10. Therefore, it is unlikely that waste product, gravel, dirt, etc. would enter the slide interconnect assembly and impede the telescoping of the respective component housing portions 11, 12 to adjust the size of the cage 10.

Also, if desired, the slide interconnect assembly 20 may be configured so that the flange 22t of the component housing portion 11 or the top of the angle member 21, as is seen in FIG. 2, for example, ordinarily is resiliently engaged with the top 42 of the flange 25 to urge the outside bottom wall of the housing portion 12 against the inside bottom wall of the housing portion 11 to maintain a relatively fluid-tight seal 43 either along the entire extent of confrontation between the bottom walls of the housing portions 11, 12 or at least at the leading edge 48 of the bottom wall of the housing portion 11 and the directly confronting bottom wall portion of the housing portion 12. Such fluid-tight seal tends to prevent excrement from leaking out of the cage 10.

Preferably the slide interconnect assembly 20 is located on both sides of the cage 10 to facilitate smooth sliding of one housing portion relative to the other when the cage is adjusted in size. Also, the slide interconnect assembly on both sides of the cage 10 helps to maintain its strength of the cage as compared to having a slide interconnect assembly only on one side. The U-shape channel member 21 also may be of a material which provides strength and/or reinforcement of the slide interconnect assembly 20 along the entire length of the slide interconnect assembly or at the end thereof adjacent the edge 43.

The housing portions 11, 12 may be molded or otherwise formed of relatively lightweight plastic material having suitable strength to avoid breakage when used and being able easily to be cleaned thoroughly. Additionally, by molding the windows 17 and possibly also the ribs 17a thereof as integral parts of the housing portions 11, 12, manufacturing is facilitated and weight is minimized. If a separate grid work is required at the windows, that grid work can be separately fastened over the openings forming the windows or, alternatively, such grid work may be molded into the body of the respective housing portion, for example, by insert molding techniques or other techniques.

The back 24b of the housing portion 11 is closed by a solid back wall; the front 26 of the housing portion 12 is closed by a wall and the door 14. If desired, other types of doors may be substituted for the door 14. Also, if desired, a door or some means other than a solid wall may be used to close the back 24b of the housing portion 11. Furthermore, although the cage 10 is shown with two housing portions 11, 12, it will be appreciated that the cage may include one or more additional housing portions or sections located between the two housing portions 11, 12 further increasing the size that the cage may be telescoped.

The various edges and junctions of the parts forming the cage 10, such as the illustrated component housing portions 11, 12 preferably are sufficiently beveled so as to avoid presenting sharp edges which could injure an animal or a person; and such smooth or beveled edges tend to reduce breakage. Furthermore, the junction between the housing portions 11, 12 may be beveled, for example, at the leading edge 48 in order to facilitate assembling the housing portions 11, 12 and the positioning of the seal member 47 with respect to the housing wall against which it slides.

Since the housing portions 11, 12 of the cage 10 are relatively strong and since there are no exposed bars or parts on which an animal inadvertently may catch its teeth, nose or paws, injury to an animal contained in the cage is minimized. Also, since the cage can be reduced to a relatively minimum size, storage when not in use is facilitated.

Figure 6:
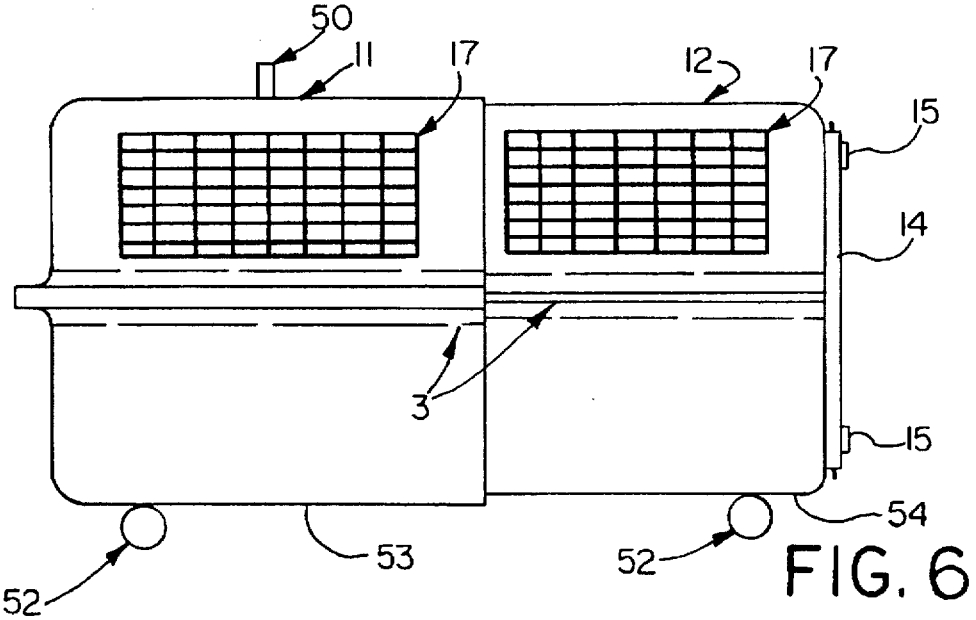
FIG. 6 is a side view of the cage.
Figure 7:
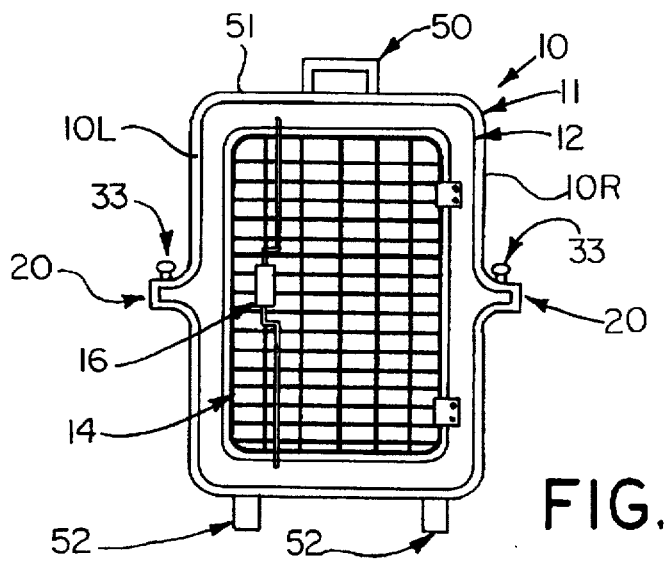
FIG. 7 is a front view of the cage.

Turning briefly to FIGS. 5–7, top, side and front views of the cage 10 are shown. In FIGS. 5 and 6, the housing portion 12 has been withdrawn to a maximum extension out from the housing portion 11 providing the largest size volume for the cage. As is seen in FIG. 5, for example, five of the openings 32 in the flanges 25 are visible, and a sixth opening 32 (not seen) is in alignment with the opening 34 and pin 33. A handle 50 is on the top wall 51 of the housing portion 11 to facilitate carrying the cage 10. If desired, a plurality of handles may be used to provide additional balance when carrying the cage 10; such handles may be spaced along the top wall 51 and an additional handle may be located in the front wall 26, for example, above the door 14. Wheels 52 may be mounted in a conventional way to the bottom walls 53, 54 or sides of the respective housing portions 11, 12, as is seen in FIGS. 6 and 7. The wheels facilitate rolling the cage 10 along a surface. The latch 16 may be a conventional double bar latch that can be manipulated to lock or to unlock the door 14 when in close position.

The present invention provides an enclosure for animals of all sizes; the enclosure easily can be made larger or smaller. An exemplary cage in accordance with the invention can expand from as small as 24 inches in length to a length as long as 40 inches.

From the foregoing, then, it will be appreciated that the cage of the present invention may be used to hold animals of various sizes and can be adjusted in size to accommodate the growth of a single animal, to facilitate house training an animal, such as a puppy, and to facilitate drying an animal as part of a bathing and grooming procedure. The cage also facilitates transporting an animal while minimizing injury to the animal.

What is claimed is:

1. An expandable pet cage, comprising:
   first and second movable compartments;
   each of said compartments having an open end and a closed or closeable end;
   said compartments always being positioned in telescoping relation with one another providing a composite volume including both of said open ends; and
   a separate substantially liquid-tight sealing member located between said compartments at the bottom thereof.

2. The cage of claim 1, further comprising a door for opening and closing access to the interior of the cage.

3. The cage of claim 1, further comprising a slide interconnect between plural compartments to permit relative sliding movement to telescope the compartments to change the size of the interior of the cage.

4. The cage of claim 3, further comprising a size locking mechanism for locking the compartments in relative position.

5. The cage of claim 3, said slide interconnect comprising a U-shape channel at one end of one of the compartments to receive a slide portion of another compartment for relative sliding motion therebetween.

6. The cage of claim 5, said U-shape channel providing mechanical reinforcement at said one end.

7. The cage of claim 1, further comprising a slide interconnect between said compartments, and along which one of said compartments can slide relative to the other of said compartments to modify the size of said composite volume, said slide interconnect being located between the top and bottom of said compartments, and including portions integral with the sides of said compartments.

8. The cage of claim 1, further comprising windows in at least one of said compartments.

9. The cage of claim 8, said windows being molded integrally with the main portion of said compartment.

10. The cage of claim 1, further comprising a handle on one compartment to facilitate transporting the cage.

11. The cage of claim 1, further comprising wheels on at least one compartment to facilitate moving the cage along a surface.

12. An expandable pet cage, comprising:
    first and second compartments;
    each of said compartments having an open end and a closed or closeable end;
    said compartments being positioned in telescoping relation providing a composite volume including both of said open ends;
    a slide interconnect between plural compartments to permit relative sliding movement to telescope the compartments to change the size of the interior of the cage; and
    a substantially liquid-tight seal between said compartments at the bottom thereof, said seal comprising a seal member of elastomeric material attached to a wall of one of the compartments and positioned to wipe against a wall of the other compartment.

13. The cage of claim 12, said seal member extending along a U-shape path across the bottom of the cage and extending up along parts of respective sides of the cage toward said slide interconnect.

14. The cage of claim 12, said seal being recessed behind a leading edge of one of the compartment walls to avoid exposure to the inside of the cage.

15. An expandable pet cage, comprising:
    first and second movable compartments;
    each of said compartments having an open end and a closed or closeable end;
    said compartments always being positioned in telescoping relation with one another providing a composite volume including both of said open ends;
    a slide interconnect between said compartments, and along which one of said compartments can slide relative to the other of said compartments to modify the size of said composite volume, said slide interconnect being located between the top and bottom of said compartments, and including portions integral with the sides of said compartments; and
    a separate substantially liquid-tight sealing member located between said compartments at the bottom thereof, said substantially liquid-tight seal being maintained during sliding of one of said compartments.

16. The cage of claim 15, said slide interconnect comprising a U-shape channel at one end of one of the compartments to receive a slide portion of another compartment for relative sliding motion therebetween.

17. The cage of claim 16, said U-shape channel providing mechanical reinforcement at said one end.

18. An expandable pet cage, comprising:
    first and second compartments;
    each of said compartments having an open end and a closed or closeable end;
    said compartments being positioned in telescoping relation providing a composite volume including both of said open ends; and a slide interconnect between said compartments, and along which one of said compartments can slide relative to the other of said compartments to modify the size of said composite volume, said slide interconnect being located between the top and bottom of said compartments, and including portions integral with the sides of said compartments, and including interengageable saw like teeth on respective compartments.

19. A method of house-training a pet, comprising the steps of:

placing the pet in a size-adjustable cage which includes a pair of relatively movable compartments, each having an open end and a closed end, whereby the compartments are always in telescoping relation with one another; and adjusting the size of said cage while maintaining the telescoping relation to confine the pet to a volume that does not permit bodily excretion at a separate area, thereby using the natural instinct of said pet to resist excreting in the volume of said confinement.

20. The method of claim 19, further comprising the step of:

enlarging said volume as said pet grows in size.

21. A method of confining a pet for travel safety, comprising the steps of:

placing a pet in a size-adjustable cage, said cage including: first and second compartments, each of said compartments movable having an open end and a closed or closable end, said compartments always being positioned in telescoping relation with one another providing a composite volume including both of said open ends, a slide interconnect between said compartments, and along which one of said compartments can slide relative to the other of said compartments to modify the size of said composite volume, said slide interconnect being located between the top and bottom of said compartments, and including portions integral with the sides of said compartments, and a separate substantially liquid-tight sealing member located between said compartments at the bottom thereof, said substantially liquid-tight seal being maintained during sliding of one of said compartments; and adjusting the size of the cage to limit undesirable movement of the pet therein, whereby said cage provides support to avoid accidental injury from jostling of the pet in the cage during transporting of the cage and the animal.

22. The method of claim 21, further comprising placing the cage and pet on an airplane.

23. A method of grooming a pet, comprising the steps of:

placing a pet in a size-adjustable cage which includes a pair of relatively movable compartments, each having an open end and a closed end, whereby the compartments are always in telescoping relation with one another; and adjusting the size of said cage while maintaining the telescoping relation to accommodate the pet for a drying part of the grooming procedure, wherein said adjusting further includes substantially minimizing the size of the cage to optimize drying efficiency.

24. The method of claim 23, further comprising blowing air on the pet to dry the pet.

* * * * *